United States Patent [19]
Van Hulle et al.

[11] Patent Number: 5,313,524
[45] Date of Patent: May 17, 1994

[54] SELF-CONTAINED ACTIVE SOUND REPRODUCER WITH SWITCHABLE CONTROL UNIT MASTER/SLAVE

[75] Inventors: Steven T. F. Van Hulle; Rudi R. F. De Laet; Omer C. J. Vanvuchelen, all of Leuven, Belgium

[73] Assignee: U.S. Philips Corporation, New York, N.Y.

[21] Appl. No.: 964,681

[22] Filed: Oct. 21, 1992

[30] Foreign Application Priority Data

Nov. 12, 1991 [EP] European Pat. Off. ........ 91202933.7

[51] Int. Cl.$^5$ .............................................. H03G 3/00
[52] U.S. Cl. ..................................... 381/105; 381/80; 381/81; 381/104; 381/123; 381/77; 381/120; 340/825.24; 340/825.25
[58] Field of Search ................. 381/80, 81, 104, 105, 381/123, 77, 120; 340/825.24, 825.25

[56] References Cited

U.S. PATENT DOCUMENTS

| 4,862,159 | 8/1989 | Marusa et al. | 381/105 |
| 5,182,551 | 1/1993 | Goto | 340/825.24 |

FOREIGN PATENT DOCUMENTS 0082905 12/1981 European Pat. Off. .

OTHER PUBLICATIONS

"Two Buses Organize the Electronic Home" *Electronics (USA)* vol. 54, No. 19 (Sep. 22, 1981) pp. 76–78, by J. Gosch.

Mano, M. Morris, *Computer Architecture*, 1982 Prentice Hall pp. 459–462.

International Electrotechnical Commission (IEC), First Edition–1989–03 (odd numbered pages–English translation (even numbered pages are in French)).

*Primary Examiner*—Curtis Kuntz
*Assistant Examiner*—Mark D. Kelly
*Attorney, Agent, or Firm*—Edward W. Goodman

[57] ABSTRACT

An active sound reproducer (76, 78) receives an audio signal and setting signals (volume settings, filter coefficients) via a digital bus (75) for processing the audio signal. Normally, the setting signals are applied by a suitable ("compatible") control unit (74). If this unit is not present, this task is taken over by one sound reproducer operating as a "master". In a setup procedure, it is determined which one of the sound reproducers operates as a master. Each sound reproducer is adapted to receive remote control signals and to transmit these signals to the master reproducer via the digital bus. This master reproducer then distributes the setting signals to the relevant sound reproducers via the digital bus. The control unit or the reproducer operating as a master may be located in another space.

14 Claims, 4 Drawing Sheets

SELF-CONTAINED ACTIVE SOUND REPRODUCER WITH SWITCHABLE CONTROL UNIT MASTER/SLAVE

BACKGROUND OF THE INVENTION

1. Field of the Invention

The invention relates to an active sound reproducer. This is understood to mean a sound reproducer which receives an unprocessed audio signal and subjects this signal to signal processing operations such as tone control and power amplification. The invention also relates to a control unit for controlling such a sound reproducer.

2. Description of the Related Art

An active sound reproducer of the type described in the opening paragraph is known from European Patent Application EP-A1-0 082 905. This known active sound reproducer has an audio input for receiving the audio signal, a signal processing circuit for processing the audio signal in response to supplied setting signals, a control input for receiving the setting signals and a control circuit for applying the setting signals to the signal processing circuit. An audio signal which is still unprocessed is applied to the sound reproducer. The term unprocessed is understood to mean that the signal has not yet undergone any processing operations such as volume, tone and balance control. The audio signal is not subjected to signal processing operations until it has reached the sound reproducer. The control signals required for this purpose are referred to as setting signals. They comprise, inter alia, the desired volume, tone and balance values and are also applied to the sound reproducer.

The known sound reproducer receives the audio signal and the setting signals from a transmitter section which will hereinafter be referred to as control unit. The control unit selects the audio signal to be reproduced from a plurality of sound sources and applies this signal to the sound reproducer. Moreover, the control unit generates the setting signals in response to remote control commands which are received from a remote control unit. Sound sources are, for example, a record player, a tuner, a cassette player, a CD player etc. The audio signal and the setting signals are digitally transmitted to the known sound reproducer. Where necessary, the audio signal from the sound source is digitized by the control unit and formatted for transmission.

It will be evident that digitization is not necessary if the sound source already generates a digital signal. It is even feasible that a given sound source, for example, a CD player, already generates a digital audio signal itself in a format which is suitable for direct supply to one or more sound reproducers. In principle, an expensive control unit is superfluous in that case. Existing sound sources such as CD players are, however, not adapted to generate the setting signals for the sound reproducer and to apply these signals to the speakers. Consequently, the known sound reproducers cannot be directly connected to a CD player. The same problem occurs if there is a control unit which is not adapted to apply the setting signals to the sound reproducers. This may occur if the control unit and the sound reproducers are not compatible, for example, because they are of different brands.

The transmission of an unprocessed audio signal and the associated setting signals to active sound reproducers has the advantage that the same audio signal, but different setting values can be applied to different sound reproducers. Said European Patent Application states that different carrier frequencies can be used for this purpose for different sound reproducers, or that the setting signals can be transmitted in time-division multiplex for a plurality of sound reproducers. It is possible, for example, to arrange a sound reproducer (or a set of sound reproducers in the case of stereo reproduction) in the living room and to arrange another sound reproducer in another space, for example, a bedroom. The same audio signal is applied to the two sound reproducers. Since the sound reproducers are implemented as active speakers and receive different setting signals, volume, tone and balance are separately adjustable in both spaces. However, the user operates the known sound reproducers in the space where the control unit is located. When the control unit is located in the living room, it is then impossible, for example, to control the sound volume in the bedroom.

SUMMARY OF THE INVENTION

The invention has for its object to meet the mentioned drawbacks of the known sound reproducer. Particularly, the invention has for its object to provide an active sound reproducer which can be coupled to components which are already existing and present, such as a CD player, as well as to a control unit to be purchased at a later stage which may be either compatible or not compatible with the sound reproducer.

In accordance with a first aspect of the invention the sound reproducer is therefore characterized in that the sound reproducer has a control output for transmitting control signals and means for receiving remote control signals. The control circuit is switchable in a "master mode". In this mode the control circuit is adapted to generate the setting signals and to apply them to the control output when remote control signals are received.

If the sound reproducer is coupled to a CD player or to an "incompatible" control unit, the sound reproducer does not receive any setting signals. It does receive remote control signals which are converted into setting signals by the control circuit for these and other reproducers. The sound reproducer now operates, as it were, as a control unit for further connected sound reproducers. The remote control signals are received, for example, via an infrared path from a remote control unit.

It is sufficient if one of the sound reproducers in an audio system is switchable in the master mode. However, in practice it is sensible if all sound reproducers in an audio system are identical. The other sound reproducers are then preferably switchable in a "slave mode" in which their control circuit is adapted to pass on the remote control signals to the "master" via their control output. It is thereby achieved that the remote control signals also reach the master, if the remote control unit is directionally sensitive and is directed towards one of the other sound reproducers. The remote control signals even reach the master or control unit if they have been received by a sound reproducer in another space.

It is to be noted that it is known per se from German Patent Specification DE 29 17 078 to receive remote control signals in a sound reproducer and pass them on to a control unit. This control unit may be arranged in another space. However, this Specification relates to passive speakers receiving an audio signal which has already been processed.

To indicate whether the control circuit in a sound reproducer is to operate either in the "master mode" or in the "slave mode", the reproducer may have, for example, a switch with a "master/slave" position to be set by the user. However, the control circuit is preferably adapted to transmit a "master request" control signal and to operate in the "master mode" if in response thereto no "master present" control signal is received. The "master request" control signal is transmitted, for example, as soon as the reproducer is switched on. If there is a compatible control unit, it is responsive to the request signal so that all connected reproducers are switched to the slave mode. If there is no compatible control unit to respond to the "master request" signal, the master function is taken over by that sound reproducer which is the first to detect the absence of the "master present" signal. This will generally be the reproducer that has been switched on first. Once switched in the master mode, the relevant reproducer subsequently distributes the "master present" control signal so that the other reproducers are switched to the slave mode.

In a further embodiment, the reproducer is provided with an audio detector to which the audio signal is applied. The control circuit is coupled to the audio detector and adapted to transmit the "master request" control signal when the audio signal is detected. This prevents a sound reproducer from operating as a master if there is a compatible control unit, but if this unit has not been switched on yet. The master function is only allocated when the control unit is switched on and when an audio signal is supplied.

The sound reproducer is preferably also provided with an audio output and switching means for applying the audio signal to the audio output. The control circuit is coupled to the switching means and adapted to apply the audio signal to the audio output during "master mode" operation. In this embodiment, the audio signal in a reproducer is coupled via its switching means to a subsequent reproducer. Thus, a plurality of sound reproducers in the form of a chain is interconnected. Initially, the audio input and audio output are not interconnected so that only the first sound reproducer of the chain receives the audio signal. This first sound reproducer now transmits the "master request" control signal. If there is no compatible control unit, there will be no response to this request. This causes the first sound reproducer to start operating as a master. The audio signal is thereby applied to the second reproducer with some delay. Moreover, the first reproducer distributes the "master present" control signal. Preferably, the other sound reproducers pass on the audio signal immediately after they have been put into the "slave mode" by the "master present" control signal. Further delays then no longer occur.

In accordance with a further aspect of the invention, the control circuit is adapted to add a transmitter address identifying the transmitting sound reproducer to a remote control signal when this signal is being transmitted. In the "master mode" the control circuit is adapted to detect the transmitter address and to associate a corresponding destination address with the transmitted setting signal. This is sensible if a first pair of reproducers is located in a space A and a second pair of reproducers is located in another space B. If the reproducer (or the control unit) operating as a master is located in space A and receives remote control signals from space B, the setting signals intended for space B are recognized and executed by the reproducers located in space B.

DESCRIPTION OF THE PREFERRED EMBODIMENTS

Figure 1:
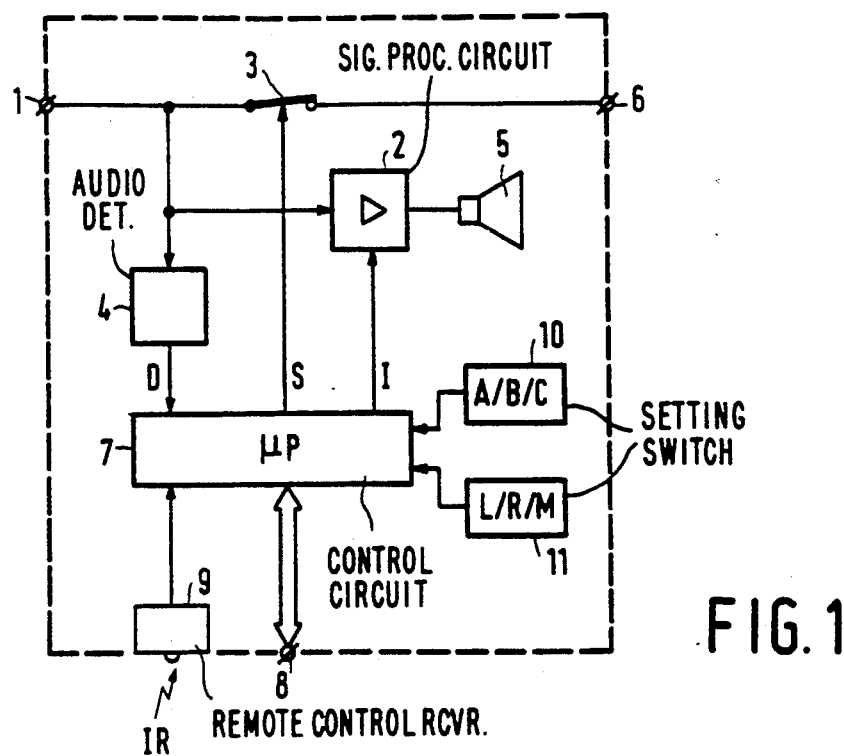
FIGS. 1 and 2 show diagrammatical embodiments of an active sound reproducer according to the invention.

FIG. 1 shows diagrammatically an embodiment of an active sound reproducer according to the invention. The active reproducer has, inter alia, an audio input 1 to which a signal processing circuit 2, a switch 3 and an audio detector 4 are coupled. A received audio signal is reproduced by a loudspeaker 5 via the signal processing circuit 2 and coupled to an audio output 6 via the switch 3. The reproducer further comprises a control circuit 7 which receives a detection signal D from the audio detector 4, applies a switching signal S to the switch 3 and controls the signal processing circuit 2 by means of setting signals I. The control circuit 7 is further coupled to a bidirectional control connection 8 for receiving and transmitting control signals, and to a remote control receiver 9 for receiving infrared remote control signals IR. The sound reproducer is also provided with a setting switch 10 to indicate whether the reproducer is located in a space A, B or C, and a setting switch 11 to indicate whether it is a left (L), right (R) or mono (M) reproducer. The switches 10 and 11 are coupled to the control circuit 7 and are set by the user.

The audio signal applied to the input 1 is preferably an internationally standardized digital stereo signal as laid down by the International Electrotechnical Commission (IEC) and described in "Digital audio interface", 1989.

The audio detector 4 may be implemented in further known manners. If the audio signal is an analog signal, the audio detector comprises, for example, a rectifier circuit and a threshold detector. If the audio signal is a digital signal, the audio detector is formed, for example, as a PLL clock regenerator detecting the presence or absence of the data signal.

The active sound reproducer shown in FIG. 1 operates as follows. The reproducer receives an unprocessed stereo signal at its audio input 1. The term unprocessed is understood to mean that the audio signal has not yet undergone any operations such as volume and tone control. The audio signal is processed in the signal processing circuit 2 in response to setting signals I in the form of gain factors, filter coefficients and the like which are supplied by the control circuit. To this end the setting signals comprise an operation code OPC and data DTA. The operation code indicates to which type of operation the setting signal relates (volume, bass, treble), the data indicates a quantitative value for the processing operation, for example, "30 dB" for volume, "150 Hz" for bass, "15 kHz" for treble.

Some setting signals are locally generated in the reproducer. Dependent on the position of setting switch 11, a setting signal is generated in order to indicate whether the signal processing circuit is to reproduce the left or right audio signal or whether it is to add the two signals for mono reproduction. The other setting signals are received by the reproducer via the bidirectional control connection 8 of a control unit located elsewhere. Such setting signals have a destination address indicating whether they are intended for a reproducer in space A, B or C. The control circuit 7 compares this destination address with the position of setting switch 10 and, in case of conformity, applies the setting signals to the signal processing circuit.

Figure 2:
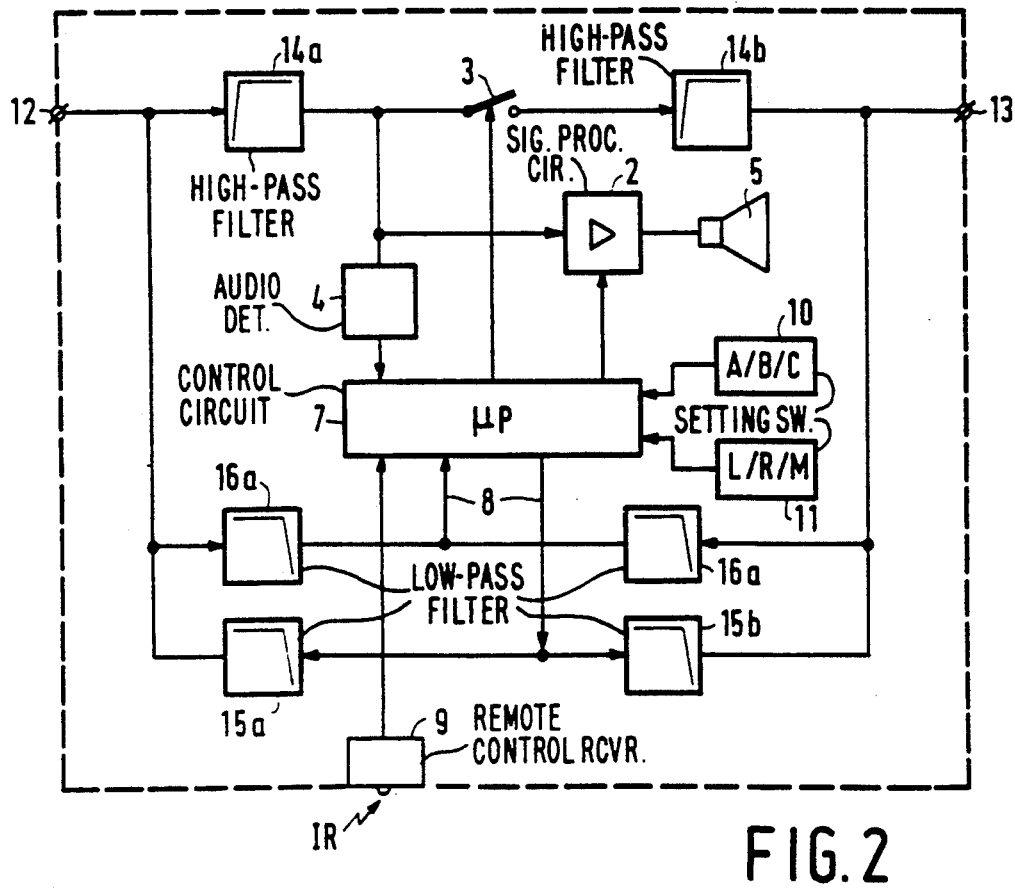

FIG. 2 shows a preferred embodiment of the active sound reproducer in which the audio signal and the control signals are received in frequency-division multiplex (FDM) and are transmitted via common connections. The previously mentioned digital stereo signal has a bit rate of approximately 1 MHz; control signals have a bit rate of approximately 1 kHz. They are combined with or separated from each other by means of filters. FIG. 2 shows the elements identical to those in FIG. 1 with identical reference numerals. A first connection 12 constitutes a bidirectional connection for control signals and an input for the digital audio signal. A second connection 13 constitutes a bidirectional connection for control signals and an output for the digital audio signal. A high-pass filter 14a separates the received audio signal from connection 12 and applies this audio signal to signal processing circuit 2, switch 3 and audio detector 4 in the manner described. A high-pass filter 14b applies the audio signal of switch 3 to a connection 13. Control signals which are generated by the control circuit 7 are applied to connection 12 via a low-pass filter 15a and to connection 13 via a low-pass filter 15b. Control signals which are received via connection 12 are applied to the control circuit via a low-pass filter 16a. Control signals which are received via connection 13 are applied to the control circuit via a low-pass filter 16b.

The control circuit 7 in the active sound reproducer (see FIGS. 1 and 2) is preferably a microprocessor which executes a program stored in a memory (not shown). This program, which is also referred to as main program, is shown diagrammatically in FIG. 3. It comprises a sub-program 40 which is executed when the sound reproducer is switched on and which will hereinafter be referred to as setup program (SU). Subsequently, the main program determines in a step 30 whether an infrared remote control signal is received by the remote control receiver (9 in FIGS. 1 and 2) or whether a control signal is received via the bidirectional connection (8, 12, 13 in FIGS. 1 and 2). In the first-mentioned case, the main program executes a sub-program 50 which will hereinafter be referred to as remote program (RM). In the last-mentioned case the main program executes a sub-program 60 which will hereinafter be referred to as control program (CTRL). The three mentioned sub-programs will hereinafter be described in greater detail.

The setup program

Figure 3:
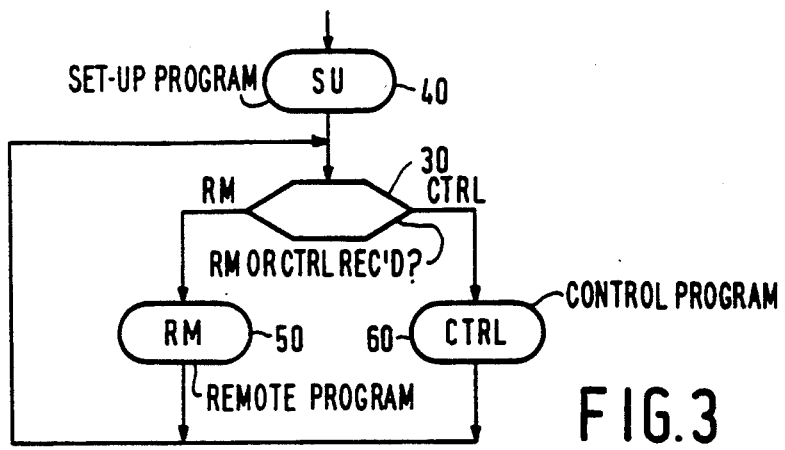
FIGS. 3 to 6 show flow charts of programs executed by a control circuit shown in FIGS. 1 and 2.
Figure 4:
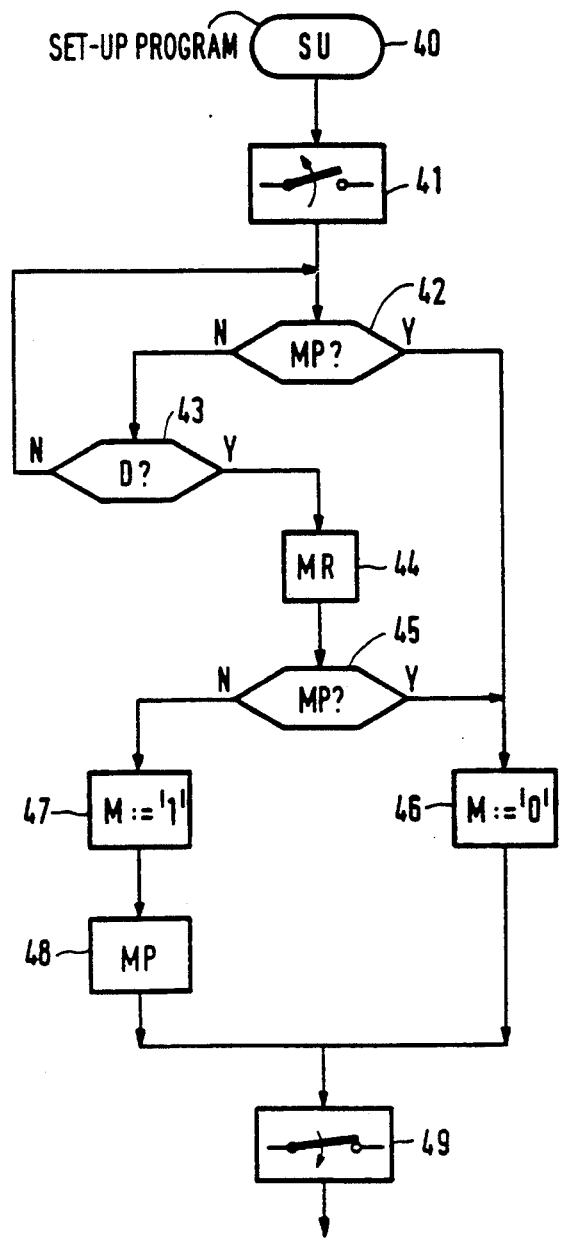

FIG. 4 shows a flowchart of the setup program SU denoted by reference numeral 40 in FIG. 3. This setup program is executed by the microprocessor when the sound reproducer is connected to the mains. In a step 41 of the setup program, the connection between the audio input and the audio output of the reproducer is interrupted by the control circuit because the microprocessor 7 opens the switch 3 (see FIGS. 1 and 2) by means of the switching signal S. Subsequently, it is ascertained in a step 42 whether a "master present" control signal MP is received via the control input. If this is not the case, it is ascertained in a step 43 whether the audio detector 4 (see FIGS. 1 and 2) detects an audio signal. If this is not the case either, the setup program returns to step 42. The reproducer is then further inactive. The setup program is continued after either a "master present" signal has been received or an audio signal has been detected. The reception of a "master present" signal is an indication to the reproducer that a compatible control unit is connected or that another reproducer operates in the master mode. In a step 46 the sound reproducer then assumes the slave mode. To this end, the value of "0" is assigned to, for example, a logic variable M in the microprocessor memory.

The setup program carries out a step 44 if the presence of an audio signal has been detected without this having been preceded by the reception of a "master present" signal. In the step 44, a "master request" control signal MR is generated and transmitted. If a compatible control unit is present, or if another reproducer has already assumed the master mode, it will respond to the request by transmitting a "master present" signal. In a step 45, this "master present" signal is recognized. In the step 46, the reproducer then assumes the slave mode. If it has been determined in the step 45 that there has been no response to the request within a predetermined period of time, the setup program performs a step 47 in which the sound reproducer assumes the master mode. To this end, the value of "1" is assigned to the logic variable M. Moreover, the microprocessor transmits, in a step 48, the "master present" signal to the other components in the audio system incorporating the reproducer.

After it has thus been determined whether the reproducer operates in either the master mode or the slave mode, the setup program performs a step 49 in which the audio input and the audio output are interconnected. The reproducer is now in a state in which it is adapted to receive control signals via the bidirectional connection or infrared remote control signals via the remote control receiver.

The remote program

Figure 5:
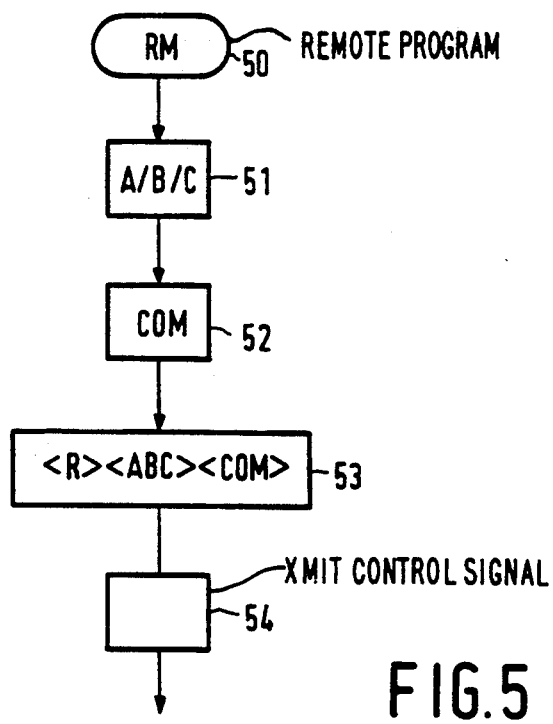

FIG. 5 shows a flowchart of the remote program RM denoted by the reference numeral 50 in FIG. 3. This remote program is executed if an infrared remote control signal is received via the remote control receiver (9 in FIGS. 1 and 2) and applied to the microprocessor. In a step 51 of the remote program, the microprocessor scans the setting switch A/B/C (10 in FIGS. 1 and 2). This switch is set by the user and indicates whether the reproducer is arranged in a space A, B or C. In the step 51, a corresponding value A, B or C is subsequently assigned to a parameter ABC. Subsequently, the remote program assigns the received remote control command to a parameter COM in a step 52. The parameter COM is representative of user commands such as "volume up", "bass down", "treble up", "balance left" and the like.

In a step 53, a control signal of the format <R-><ABC><COM> is composed. <R> represents a preamble indicating that the control signal represents a remote control signal. <ABC> and <COM> represents the space and the user command, respectively. The control signal thus composed is transmitted in a step 54. The remote program has then ended.

It is to be noted that the remote program is performed by each sound reproducer if it receives a remote control signal. It is irrelevant whether the reproducer operates in the master mode or in the slave mode.

The control program

Figure 6:
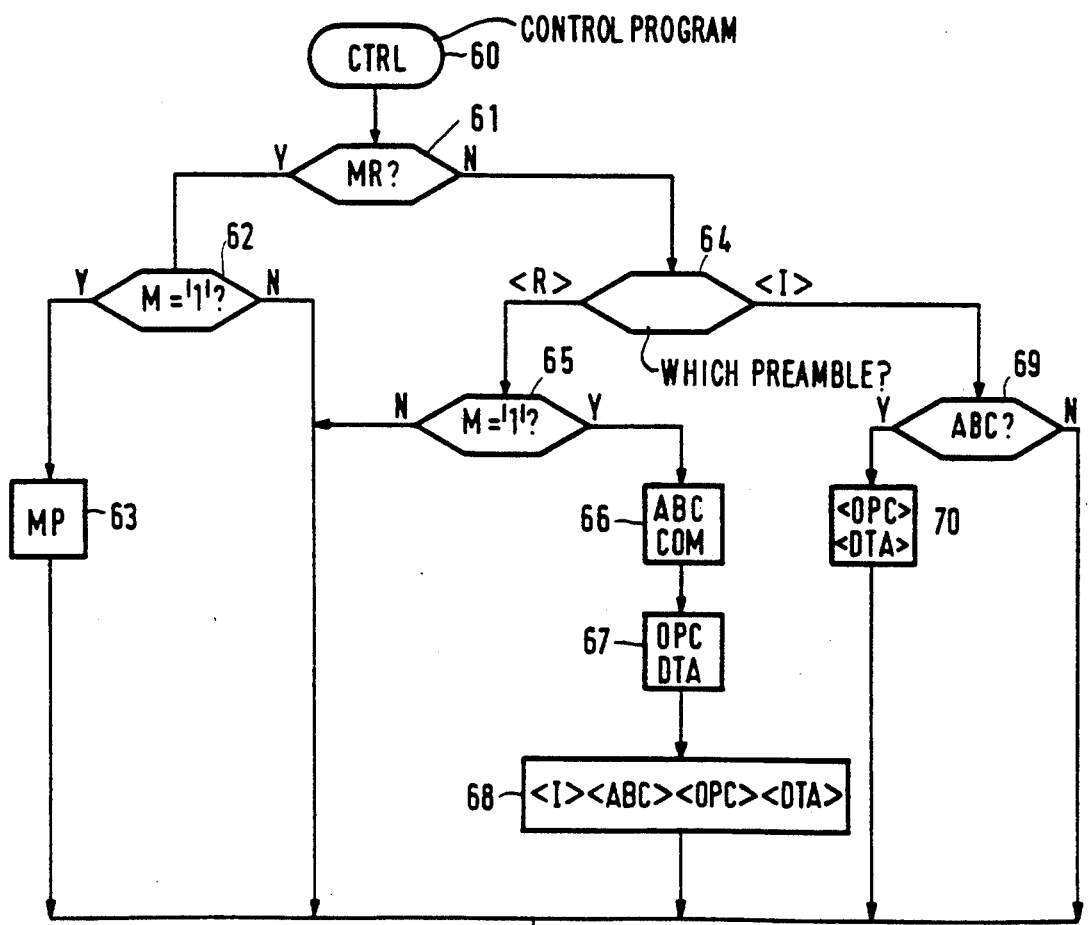

FIG. 6 shows a flowchart of the control program CTRL denoted by the reference numeral 60 in FIG. 3. This control program is executed if a control signal is received via a bidirectional control connection (8, 12, 13 in FIGS. 1 and 2).

In a step 61, the control program ascertains whether the received control signal is a "master request" control signal MR. As will be described, such a "master request" signal may be transmitted by another reproducer at an arbitrary instant. If the control signal is a "master request" signal, the control program ascertains in a step 62 whether the reproducer operates in the master mode. If this is the case, the reproducer distributes the "master present" control signal MP in a step 63 of the control program. If the reproducer operates in the slave mode, the control program does not react to the "master request" signal.

In a step 64, the type of the received control signal among control signals other than the "master request" signal is determined. To this end, it is ascertained with which preamble the control signal is provided. It has been described in the foregoing that the control signal may be provided with a preamble <R> to indicate that the control signal represents a user command generated by a remote control unit. However, the control signal may alternatively be a setting signal to be applied to the signal processing circuit. As will be described hereinafter, the control signal is then provided with a preamble <I>.

If it has been determined in the step 64 that the control signal is provided with the preamble <R>, it is ascertained in a step 65 whether the reproducer operates in the master mode. If this is not the case, the control signal is not further processed and the control program ends. If the reproducer operates in the master mode, the following will happen. In a step 66, the space code <ABC> and the command <COM> are read from the control signal. For example, the control signal <R><ABC=B><COM="volume plus"> means that a "volume plus" user command has been generated in space B. In an internal memory, the control program checks the current setting values of the reproducers in the space B. In a step 67, the command <COM> is subsequently converted into an operation code OPC and data DTA to be applied to the signal processing circuit of the relevant reproducer(s). For example, in the case of a "volume plus" command, an amount of 3 dB should be added to the current volume setting for the reproducers in space B. If the current volume setting is 50 dB, the control program composes, in the step 67, a setting signal of the format <OPC=volume><DTA=53>. If the command had been a "balance left", the control program would have generated, for example, a setting signal of the format <OPC=volume><DTA=53 left, 47 right>.

Subsequently a control signal of the format <I><ABC><OPC><DTA> is composed and transmitted in a step 68. <ABC> is the same space code as the one which was present in the received control signal and <I> represents a preamble indicating that the control signal represents a setting signal. The control program has then ended.

As is apparent from the foregoing, the control signals received by the control program may be provided with the preamble <I>. These are setting signals comprising an operation code <OPC> and data <DTA> to be applied to the signal processing circuit. If it has been determined in the step 64 that a control signal is of such a type, the space code <ABC> in the control signal is compared, in a step 69, with the position of the setting switch 10 (see FIGS. 1 and 2) on the reproducer. If they do not correspond, the setting signal is apparently not intended for the relevant space and the control signal is ignored. If the received space code corresponds to the setting switch, the control program applies, in a step 70, the received operation code <OPC> and data <DTA> to the signal processing circuit. If these are data which are different for the left and the right reproducer, for example, when the previously mentioned setting signal of the format <OPC=volume><DTA=53 left, 47 right> is received, the control program scans the position of the setting switch 11 (see FIGS. 1 and 2) and performs the desired operation accordingly.

The effect of the above-described setup program 40, remote program 50 and control program 60 will hereinafter be explained for two possible configurations of an audio system.

An audio system with a compatible control unit

Figure 7:
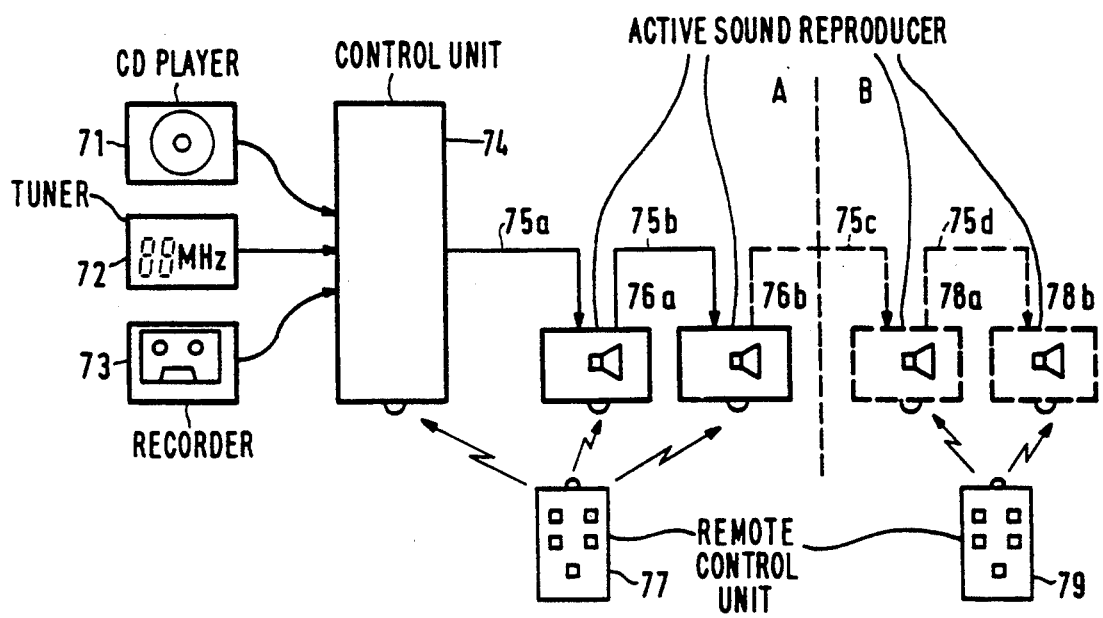
FIGS. 7 and 8 show possible configurations of an audio system incorporating active sound reproducers.

FIG. 7 shows a configuration of an audio system incorporating a plurality of active sound reproducers. The audio system comprises a plurality of sound sources such as a CD player 71, a radio tuner 72 and a cassette recorder 73. These sound sources are connected to respective inputs of a control unit 74. The selected audio signal is applied in a digital format to a first active sound reproducer 76a via a connection 75a and subsequently to a second active sound reproducer 76b via the first reproducer and a connection 75b. The connections 75a and 75b constitute, as shown in FIG. 2, a bidirectional communication bus for control signals. This communication bus is further denoted by the reference numeral 75. Both the control unit 74 and the two reproducers 76a and 76b may receive infrared remote control signals from a remote control unit 77.

FIG. 7 shows in broken lines that further sound reproducers 78a and 78b may be coupled to the system via connections 75c and 75d. These further reproducers may be arranged in another space B than the space A in which the sound sources 71-73, the control unit 74 and the reproducers 76a and 76b are located. They receive infrared remote control signals from a remote control unit 79 which is located in space B.

The control unit 74 is adapted to transmit the "master present" control signal when the power supply is switched on and when a "master request" signal is received. The control unit is also adapted to receive, via the communication bus 75, remote control signals from the remote control units 77 and 79 and to convert these signals into setting signals having the space code A or B respectively. To this end the control unit also comprises a microprocessor (not shown) which executes the same program steps as those which are executed by a sound reproducer in the "master mode".

It will initially be assumed that the reproducers 78a and 78b in the space B have not been coupled to the system. As long as the control unit 74 is not switched on, the two reproducers 76a and 76b neither receive an audio signal nor a control signal. After the control unit 74 has been switched on, it distributes a "master present" control signal via the communication bus 75. The two reproducers receive this control signal (step 42) and accordingly operate in the slave mode (step 46). Moreover, the audio input is interconnected to the audio output (step 49). For the audio system shown in FIG. 7 this means that both reproducers 76a and 76b receive the audio signal. The setup program 40 has now caused the two reproducers to operate in the slave mode and to receive an audio signal.

Remote control signals from remote control unit 77 in space A are received by the control unit 74 and/or one or both sound reproducers 76a or 76b. Remote control signals which are received by a sound reproducer are provided by this sound reproducer with a preamble <R> and space code <A> and applied to the communication bus 75 (steps 51-54). They are received by the control unit which, in response thereto, applies setting signals to the sound reproducers. The sound reproducers 76a and 76b in the space A process these setting signals (step 70). The because the space code <A> does not correspond to the space in which these reproducers are located (step 69).

If the two further sound reproducers 78a and 78b are switched on in this situation, as is shown by means of broken lines in FIG. 7, these reproducers as yet execute the setup program. The two reproducers wait for either a "master present" control signal or an audio signal (steps 42 and 43). If there is already an audio signal, it interconnected in reproducer 76b, whereas this is not yet the case in reproducer 78a. Due to the reception of the audio signal (step 43) reproducer 78a generates a "master request" signal and applies it to the communication bus 75 (step 44). The control unit responds to this request by distributing a "master present" signal. This signal is received by all reproducers. More particularly, reproducer 78a receives this signal in step 45 of its setup program, while reproducer 78b receives this signal in step 42 of its setup program. In both cases the reproducer now assumes the slave mode (step 46) and the audio signal is interconnected. All reproducers in the chain now receive the audio signal.

Remote control signals from remote control unit 79 in space B are received by one or both sound reproducers 78a and 78b which provide these signals with a preamble <R> and space code <B> and apply them to the communication bus 75 (steps 51-54). They are received by the control unit which, in response thereto, applies setting signals to the sound reproducers. These setting signals are processed by the sound reproducers 78a and 78b in the space B (step 70). These setting signals are not processed by the sound reproducers 76a and 76b in the space A because the space code <B> does not correspond to the space in which these reproducers are located (step 69).

An audio system without a compatible control unit.

Figure 8:
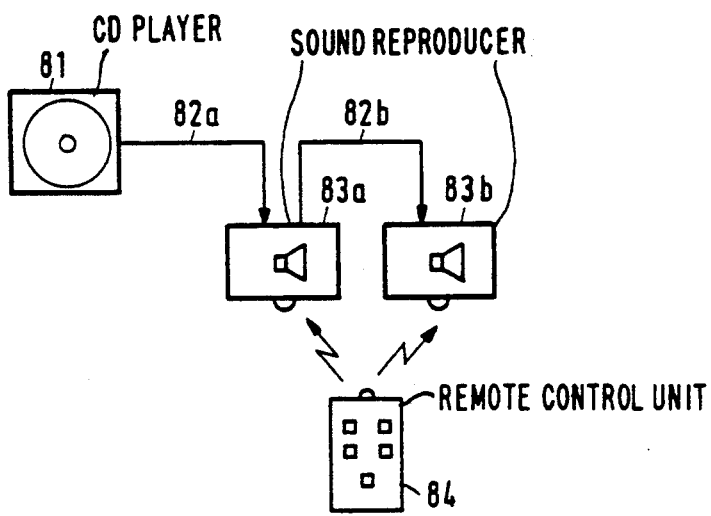

FIG. 8 shows a further possible configuration of an audio system incorporating a plurality of active sound reproducers. The system shown in FIG. 8 comprises a digital sound source 81, for example a CD player. It is coupled to a reproducer 83a via a connection 82a and to a reproducer 83b via a connection 82b. The connections 82a and 82b constitute a communication bus for control signals, which bus is denoted by the reference numeral 82. However, the CD player is not adapted to transmit or receive control signals via this bus 82. The two reproducers receive infrared remote control signals from a remote control unit 84.

As soon as the CD player 81 is switched on and generates an audio signal, reproducer 83a detects this audio signal in step 43 of its setup program. Reproducer 83b does not receive the audio signal because the interconnection between audio input and output in receiver 83a has not yet become effective. Reproducer 83a now transmits a "master request" signal (step 44). The CD player does not respond thereto. Since reproducer 83a does not receive a "master present" signal, this reproducer will now start operating in the master mode (step 47) and transmit the "master present" signal (step 48). Reproducer 83b receives the "master present" signal (step 42) and consequently this reproducer 83b will start operating in the slave mode (step 46). In both reproducers the audio signal is applied to the audio output (step 49) so that also reproducer 83b receives the audio signal. As it were, the first reproducer in the chain takes over the function of control unit in this example.

Remote control signals from remote control unit 84 are received by one or both sound reproducers 83a, 83b and applied by these reproducers to the communication bus 83 (steps 51-54). They are processed by the sound reproducer 83 a operating as a master. In response thereto, this reproducer applies setting signals to the communication bus (steps 66-68) which are received and processed by the sound reproducers (step 70).

If further sound reproducers in another space were coupled to the audio system shown in FIG. 8, sound reproducer 83a would also operate as a control unit for these further sound reproducers.

What is claimed is:

1. An active sound reproducer, comprising:
   an audio input for receiving an audio signal;
   a signal processing circuit for processing the audio signal in response to applied setting signals;
   a control input for receiving control signals including said setting signals;
   a control circuit, coupled to the control input, for applying the setting signals to the signal processing circuit, characterized in that the sound reproducer has a control output for transmitting control signals and means for receiving remote control signals, and in that the control circuit is switchable in a "master mode" in which said control circuit is adapted to generate the setting signals and to apply said setting signals to the control output when remote control signals are received, and in a "slave mode" in which said control circuit is adapted to apply received remote control signals to said control output. said slave mode being effected even if the received remote control signals result in setting signals for controlling the active sound reproducer.

2. A sound reproducer as claimed in claim 1, characterized in that the control circuit is adapted to transmit a "master request" control signal and to operate in the "master mode" if, in response thereto, no "master present" control signal is received.

3. A sound reproducer as claimed in claim 2, characterized in that the control circuit is adapted to operate in the "slave mode" in response to the reception of a "master present" control signal.

4. A sound reproducer as claimed in claim 2, characterized in that the control circuit is adapted to transmits the "master present" control signal in the "master mode".

5. A sound reproducer as claimed in 2, characterized in that the sound reproducer is further provided with detection means for detecting the reception of an audio signal, said detection means being coupled to the control circuit, the control circuit being adapted to transmit the "master request" control signal when an audio signal is detected.

6. A sound reproducer as claimed in claim 5, characterized in that the sound reproducer is further provided with an audio output and switching means for applying the audio signal to the audio output said switching means being coupled to the control circuit, and said control circuit being adapted to apply the audio signal to the audio output in the "master mode".

7. A sound reproducer as claimed in claim 6, characterized in that the control circuit is adapted to apply the audio signal to the audio output when the "master present" control signal is received.

8. A sound reproducer as claimed in claim 1 of characterized in that the control circuit is adapted to detect a transmitter address associated with the received remote control signal in the "master mode" and to associate a corresponding destination address with the transmitted setting signal.

9. A sound reproducer as claimed in claim 1, characterized in that the control circuit is adapted to associate a transmitter address with the remote control signal when a remote control signal is transmitted, said transmitted address identifying the transmitting sound reproducer.

10. A sound reproducer as claimed in claim 1, characterized in that the control input and control output are combined in the form of a bidirectional control connection.

11. A sound reproducer as claimed in claim 10, characterized in that the bidirectional control connection is coupled to the audio input and audio output by means of filters.

12. A control unit for controlling at least one active sound reproducer as claimed in claim 1, comprising:
   an audio output for transmitting an audio signal;
   a control connection for transmitting control signals; characterized in that the control unit is further adapted to transmit a "master present" control signal.

13. A control unit as claimed in claim 12, characterized in that it is further adapted to receive control signals and to transmit the "master present" control signal in response to the reception of a "master request" control signal.

14. A control unit as claimed in claim 13, characterized in that the control unit is further adapted to associate a corresponding destination address with the transmitted setting signal when a remote control signal with an associated transmitter address is received.

* * * * *